US010392806B2

(12) United States Patent
Shiao et al.

(10) Patent No.: US 10,392,806 B2
(45) Date of Patent: Aug. 27, 2019

(54) ROOFING GRANULES WITH HIGH SOLAR REFLECTANCE, ROOFING PRODUCTS WITH HIGH SOLAR REFLECTANCE, AND PROCESSES FOR PREPARING SAME

(71) Applicant: CertainTeed Corporation, Malvern, PA (US)

(72) Inventors: Ming Liang Shiao, Collegeville, PA (US); Husnu M. Kalkanoglu, Swarthmore, PA (US)

(73) Assignee: CertainTeed Corporation, Malvern, PA (US)

( * ) Notice: Subject to any disclaimer, the term of this patent is extended or adjusted under 35 U.S.C. 154(b) by 0 days.

(21) Appl. No.: 15/337,928

(22) Filed: Oct. 28, 2016

(65) Prior Publication Data

US 2017/0051508 A1    Feb. 23, 2017

Related U.S. Application Data

(63) Continuation of application No. 13/043,036, filed on Mar. 8, 2011, now abandoned.
(Continued)

(51) Int. Cl.
*E04D 1/22* (2006.01)
*E04D 7/00* (2006.01)
(Continued)

(52) U.S. Cl.
CPC .............. *E04D 1/22* (2013.01); *C04B 20/107* (2013.01); *C04B 20/1033* (2013.01);
(Continued)

(58) Field of Classification Search
CPC .......... C04B 20/1051; C04B 35/62884; C04B 20/1033; C04B 35/62807; C04B 20/107;
(Continued)

(56) References Cited

U.S. PATENT DOCUMENTS

| 1,943,525 A | 1/1934 | Gundlach |
| 2,057,678 A | 10/1936 | Gundlach |

(Continued)

FOREIGN PATENT DOCUMENTS

| EP | 0003302 | 6/2008 |
| GB | 1214816 | 6/2008 |

(Continued)

OTHER PUBLICATIONS

Adobe Systems Inc., Technical Guides "Color Models, CIELAB" 2 pgs., 2000.
(Continued)

*Primary Examiner* — Nathan L Van Sell
(74) *Attorney, Agent, or Firm* — McDonnell Boehnen Hulbert & Berghoff LLP

(57) ABSTRACT

A solar heat-reflective roofing product includes a base sheet, and solar heat-reflective roofing granules on top of the base sheet. The granules have a base particle with a flake-like geometry covered by a uniform coating layer. The coating layer has a thickness of at least one mil and includes a coating binder and at least one solar heat-reflective pigment. The solar heat-reflective pigment provides a solar heat reflectance of greater than 70 percent to the granules and the roofing product. Roofing products including roofing shingles and roofing membranes are described.

27 Claims, 3 Drawing Sheets

Related U.S. Application Data

(60) Provisional application No. 61/313,911, filed on Mar. 15, 2010.

(51) Int. Cl.
| | |
|---|---|
| *E04D 1/00* | (2006.01) |
| *E04B 1/78* | (2006.01) |
| *D06N 5/00* | (2006.01) |
| *C04B 35/628* | (2006.01) |
| *C04B 35/626* | (2006.01) |
| *C04B 33/14* | (2006.01) |
| *C04B 20/10* | (2006.01) |
| *C04B 111/00* | (2006.01) |

(52) U.S. Cl.
CPC ...... *C04B 20/1051* (2013.01); *C04B 20/1085* (2013.01); *C04B 33/14* (2013.01); *C04B 35/62695* (2013.01); *C04B 35/62807* (2013.01); *C04B 35/62884* (2013.01); *D06N 5/003* (2013.01); *E04B 1/78* (2013.01); *E04D 7/005* (2013.01); *C04B 2111/00586* (2013.01); *C04B 2235/3232* (2013.01); *C04B 2235/349* (2013.01); *C04B 2235/5292* (2013.01); *C04B 2235/5296* (2013.01); *C04B 2235/5427* (2013.01); *C04B 2235/5463* (2013.01); *C04B 2235/9661* (2013.01); *E04D 2001/005* (2013.01); *Y02A 30/255* (2018.01); *Y02B 80/34* (2013.01); *Y10T 428/2438* (2015.01); *Y10T 428/2991* (2015.01); *Y10T 428/2993* (2015.01)

(58) Field of Classification Search
CPC ................ C04B 20/1085; C04B 33/14; C04B 35/62695; C04B 2235/5463; C04B 2235/5427; C04B 2235/5296; C04B 2235/349; C04B 2235/3232; C04B 2111/00586; C04B 2235/9661; C04B 2235/5292; E04D 1/22; E04D 7/005; E04D 2001/005; E04B 1/78; D06N 5/003; Y02B 80/34; Y10T 428/2438; Y10T 428/2991; Y10T 428/2993

See application file for complete search history.

(56) References Cited

U.S. PATENT DOCUMENTS

| | | |
|---|---|---|
| 2,057,679 A | 10/1936 | Gundlach |
| 2,507,677 A | 10/1936 | Gundlach |
| 2,133,728 A | 10/1938 | Teetor |
| 2,378,927 A | 6/1945 | Jewett |
| 2,379,358 A | 6/1945 | Jewett |
| 2,417,058 A | 3/1947 | Buzzell et al. |
| 2,591,149 A | 4/1952 | Grove |
| 2,614,051 A | 10/1952 | Buzzell et al. |
| 2,695,851 A | 11/1954 | Lodge |
| 2,732,311 A | 1/1956 | Hartwright |
| 2,898,232 A | 8/1959 | Miller et al. |
| 2,927,045 A | 3/1960 | Lodge et al. |
| 2,963,378 A | 12/1960 | Palmquist |
| 2,981,636 A | 4/1961 | Lodge et al. |
| 2,986,476 A | 5/1961 | Larssen |
| 3,255,031 A | 6/1966 | Lodge et al. |
| 3,945,945 A | 3/1976 | Kiovsky et al. |
| 4,378,408 A | 3/1983 | Joedicke |
| 4,504,402 A | 3/1985 | Chen et al. |
| 4,583,486 A | 4/1986 | Miller |
| 4,675,140 A | 6/1987 | Sparks et al. |
| 4,708,812 A | 11/1987 | Hatfield |
| 4,717,614 A | 1/1988 | Bondoc et al. |
| 4,916,014 A | 4/1990 | Weber et al. |
| 5,000,999 A | 3/1991 | Hollander |
| 5,240,760 A | 8/1993 | George et al. |
| 5,484,477 A | 1/1996 | George et al. |
| 5,514,350 A | 5/1996 | Kear et al. |
| 5,595,813 A | 1/1997 | Ogawa et al. |
| 5,616,532 A | 4/1997 | Heller et al. |
| 5,783,506 A | 7/1998 | Eppler et al. |
| 5,840,111 A | 11/1998 | Wiederhoft et al. |
| 5,876,683 A | 3/1999 | Glumac et al. |
| 5,928,761 A | 7/1999 | Hedblom et al. |
| 5,962,143 A | 10/1999 | Krauthauser et al. |
| 6,037,289 A | 3/2000 | Chopin et al. |
| 6,174,360 B1 | 1/2001 | Sliwinski et al. |
| 6,245,850 B1 | 6/2001 | Fields |
| 6,362,121 B1 | 3/2002 | Chopin et al. |
| 6,366,397 B1 | 4/2002 | Genjima et al. |
| 6,376,075 B1 | 4/2002 | Tacke-Willemsen et al. |
| 6,446,402 B1 | 9/2002 | Byker et al. |
| 6,454,848 B2 | 9/2002 | Sliwinski et al. |
| 6,465,088 B1 | 10/2002 | Talpaert et al. |
| 6,500,555 B1 | 12/2002 | Khaldi |
| 6,521,038 B2 | 2/2003 | Yanagimoto et al. |
| 6,533,961 B2 | 3/2003 | Harelstad et al. |
| 6,548,145 B2 | 4/2003 | Joedicke |
| 6,569,520 B1 | 5/2003 | Jacobs |
| 6,596,070 B1 | 7/2003 | Schmidt et al. |
| 6,599,355 B1 | 7/2003 | Schmidt et al. |
| 6,607,781 B2 | 8/2003 | Joedicke |
| 6,610,135 B1 | 8/2003 | Ohmori et al. |
| 6,610,147 B2 | 8/2003 | Aschenbeck |
| 6,647,688 B1 | 11/2003 | Gaitan et al. |
| 6,653,356 B2 | 11/2003 | Sherman |
| 6,680,134 B2 | 1/2004 | Maurer et al. |
| 6,692,824 B2 | 2/2004 | Benz et al. |
| 6,703,127 B2 | 3/2004 | Davis et al. |
| 6,872,240 B2 | 3/2005 | Pellegrin |
| 6,881,701 B2 | 4/2005 | Jacobs |
| 6,933,007 B2 | 8/2005 | Fensel et al. |
| 7,070,843 B2 | 7/2006 | Bartek et al. |
| 7,070,844 B2 | 7/2006 | Bartek |
| 7,238,408 B2 | 7/2007 | Aschenbeck et al. |
| 7,241,500 B2 | 7/2007 | Shiao et al. |
| 7,335,419 B2 | 2/2008 | Azari et al. |
| 7,422,989 B2 | 9/2008 | Kalkanoglu et al. |
| 7,452,598 B2 | 11/2008 | Shiao et al. |
| 7,455,899 B2 | 11/2008 | Gross et al. |
| 7,592,066 B2 | 9/2009 | Shiao et al. |
| 7,811,630 B2 | 10/2010 | Hong et al. |
| 2002/0160151 A1 | 10/2002 | Pinault et al. |
| 2003/0035972 A1 | 2/2003 | Hanson et al. |
| 2003/0068469 A1 | 4/2003 | Aschenbeck et al. |
| 2003/0091795 A1 | 5/2003 | Kiik et al. |
| 2003/0091814 A1 | 5/2003 | Benz et al. |
| 2003/0152747 A1 | 8/2003 | Fensel et al. |
| 2005/0053745 A1 | 3/2005 | Bartek et al. |
| 2005/0053746 A1 | 3/2005 | Bartek |
| 2005/0064197 A1 | 3/2005 | Azari et al. |
| 2005/0069707 A1 | 3/2005 | Tysoe et al. |
| 2005/0072110 A1 | 4/2005 | Shiao et al. |
| 2005/0072114 A1 | 4/2005 | Shiao et al. |
| 2005/0126441 A1 | 6/2005 | Skelhorn |
| 2005/0238848 A1* | 10/2005 | Fensel ............... B32B 5/16 428/143 |
| 2006/0099397 A1 | 5/2006 | Thierauf et al. |
| 2006/0251807 A1 | 11/2006 | Hong et al. |
| 2007/0065640 A1 | 3/2007 | Joedicke |
| 2007/0065641 A1 | 3/2007 | Joedicke |
| 2008/0008832 A1 | 1/2008 | Shiao et al. |
| 2008/0008858 A1 | 1/2008 | Hong et al. |
| 2009/0117329 A1 | 5/2009 | Leitch et al. |
| 2011/0027533 A1 | 2/2011 | Kennedy et al. |

FOREIGN PATENT DOCUMENTS

| | | |
|---|---|---|
| JP | 61176501 | 8/1986 |
| JP | 2004162482 | 6/2004 |
| WO | 9423580 | 10/1994 |

(56) References Cited

FOREIGN PATENT DOCUMENTS

| WO | 0011949 | 3/2000 | |
|---|---|---|---|
| WO | WO 2008147972 A2 * | 12/2008 | ........... C04B 18/021 |

OTHER PUBLICATIONS

Adobe Systems Inc., Technical Guides "Color Models, the CIE Color Models," 2 pgs., 2000.
Adobe Systems Inc., Technical Guides "Color Models, CIEXYZ," 2 pgs., 2000.
Adobe Systems Inc., Technical Guides "Color Models, the Munsell Color Syste," 4 pgs., 2000.
BASF Aktiengesellschaft, "Product Specification, SIXOLUX Metal Gloss L 6015," 1 pg., Sep. 18, 2002.
BASF Aktiengesellschaft, "Product Specification, SIXOLUX Copper Gloss L3015," 1 pg., Sep. 18, 2002.
BASF Corporation, BASF launches two new pigments for tile coatings, by BASF Corp., 1 pg., 1988-2003.
Ferro Corporation, "Cool Colors & Eclipse Heat and Energy Saving Pigments," 2 pgs., 1999-2003.
Ferro Corporation, "How Cool Colors & Eclipse Work," 3 pgs., 2003.
G. Beestman, "Microencapsulation of Solid Particles" (H. B. Scher, Ed.,) Marcel Deeker, Inc., pp. 31-54 New York.
Gaco Western Inc., "Solar Reflectivity of Common Roofing Materials and GACOFlex Roof Coatings," 2 pgs., undated.

Gifty Osel-Prempel, et al., "Synthesis and Application of Furorocarbon Functionalized Mesoporous Silica" Materkals Engineering and Sciences Division # 574, 2006.
H. Akabari, "Cool Colored Materials for Roofs," Lawrence Radiation Laboratory, presented at Emerging Technologies in Energy Efficiency-Summit 2004, San Francisco, Oct. 14, 2004.
L. Sung, et al., "Characterization of Coating Microstructure Using Laser Scanning Confocal Microscopy," Polymer Materials, Science and Engineering, 83, 243-244, 2000.
L. Sung, et al., "Characterization of Coating Microstructure Using Laser Scanning Confocal Microscopy," undated.
Ming-Zhi, et al., "A novel fabrication of meso-porous silica film by sol-gel of TEOS," Journal of Zhejiang University Science, 427-442, 2004.
Project Advisory Committee Meeting, "Development of Cool Colored Roofing Materials," Oak Ridge National Laboratory and Livermore Berkeley National Laboratory, 55 pgs., Mar. 11, 2003.
Qingyuan Hu, "Synthesis and Characterization of Functionalized Mesoporous Silica by Aerosol-Assisted Self-Assembly," Chemical & Biomolecular Engineering, # 574, 2006.
Rhonda Strous, "Silica Sol as Nanoglue," Naval Research Laboratory, American Physical Society, Mar. 2000.
Silberline Manufacturing Co., Inc., "StarBrite," 1 pg., 2003.
T. A. Germer, et al., "Modeling the appearance of special effect pigment coatings," Surface Scattering and Diffraction for Advance Metrology, Proc., SPIE4447, 77-96, 2001.
Y. Jiang, et al., "Novel Pigment Approaches in Optically Variable Security Inks Including Polarizing Cholesteric Liquid Crystal (CLC) Polymers," Optical Security and Counterfeit Deterrence Techniques IV, SPIE 4677, 2000.

* cited by examiner

ROOFING GRANULES WITH HIGH SOLAR REFLECTANCE, ROOFING PRODUCTS WITH HIGH SOLAR REFLECTANCE, AND PROCESSES FOR PREPARING SAME

CROSS-REFERENCE TO RELATED APPLICATIONS

This application is a continuation of pending U.S. patent application Ser. No. 13/043,036 filed Mar. 8, 2011, which claimed the priority of U.S. Provisional Patent Application No. 61/313,911 filed Mar. 15, 2010, each incorporated herein by reference.

BACKGROUND OF THE INVENTION

1. Field of the Invention

The present application relates to roofing granules and roofing products including roofing products, such as roofing shingles and roofing membranes.

2. Brief Description of the Prior Art

Asphalt shingles or bitumen roofing membranes are conventionally used in the United States and Canada as roofing and siding materials. Roofing granules are typically distributed over the upper or outer face of such shingles. The roofing granules, in general are formed from mineral materials, and serve to provide the shingle with durability. They protect the asphalt from the effects of the solar radiation (in particular from the degradative effects of ultraviolet rays) and of the environment (wind, precipitation, pollution, and the like), and contribute to better reflection of incident radiation. The granules moreover are typically colored, naturally or artificially by way of the application of pigments, to meet the aesthetic requirements of the user.

Roofing granules typically comprise crushed and screened mineral materials, which are subsequently coated with a binder containing one or more coloring pigments, such as suitable metal oxides. The binder can be a soluble alkaline silicate that is subsequently insolubilized by heat or by chemical reaction, such as by reaction between an acidic material and the alkaline silicate, resulting in an insoluble colored coating on the mineral particles. For example, U.S. Pat. No. 1,898,345 to Deming discloses coating a granular material with a coating composition including a sodium silicate, a coloring pigment, and a colloidal clay, and heating below the fusing temperature of sodium silicate, and subsequently aluminum sulphate, that will react with the sodium silicate to form an insoluble compound. Similarly, U.S. Pat. No. 2,378,927 to Jewett discloses a coating composition for roofing granules consisting of sodium silicate, and clay or another aluminum-bearing compound such as sodium aluminate, or cryolite or other insoluble fluorides such as sodium silicofluoride, and a color pigment. The coating is then heat cured at a temperature above the dehydration temperature of the coating materials, but below the fusion temperature at which the combination of materials fuses, thus producing a non-porous, insoluble weather-resistant cement. Roofing granules are typically produced using inert mineral particles with metal-silicate binders and clays as a latent heat reactant at an elevated temperature, for example, such as those described in U.S. Pat. No. 2,981,636. The granules are employed to provide a protective layer on asphaltic roofing materials such as shingles, and to add aesthetic values to a roof.

Pigments for roofing granules have usually been selected to provide shingles or membranes having an attractive appearance, with little thought to the thermal stresses encountered on shingled roofs. However, depending on location and climate, shingled roofs can experience very challenging environmental conditions, which tend to reduce the effective service life of such roofs. One significant environmental stress is the elevated temperature experienced by roofing shingles under sunny, summer conditions, especially roofing shingles coated with dark colored roofing granules. Although such roofs can be coated with solar reflective paint or coating material, such as a composition containing a significant amount of titanium dioxide pigment, in order to reduce such thermal stresses, this utilitarian approach will often prove to be aesthetically undesirable, especially for residential roofs.

Mineral surfaced asphalt shingles, such as those described in ASTM D225 or D3462, are generally used in steep-sloped roofs to provide water-shedding function while adding aesthetically pleasing appearance to the roofs. The asphalt shingles are generally constructed from asphalt-saturated roofing felts and surfaced by pigmented color granules, such as those described in U.S. Pat. No. 4,717,614. Asphalt shingles coated with conventional roofing granules are known to have low solar heat reflectance, and hence will absorb solar heat especially through the near infrared range (700 nm-2500 nm) of the solar spectrum. This phenomenon is increased as the granules covering the surface become dark in color. For example, while white-colored asphalt shingles can have solar reflectance in the range of 25-35%, dark-colored asphalt shingles can only have solar reflectance of 5-15%. Furthermore, except in the white or very light colors, there is typically only a very small amount of pigment in the conventional granule's color coating that reflects solar radiation well. As a result, it is common to measure temperatures as high as 77 degrees C. on the surface of black roofing shingles on a sunny day with 21 degrees C. ambient temperature. Absorption of solar heat may result in elevated temperatures at the shingle's surroundings, which can contribute to the so-called heat-island effects and increase the cooling load to its surroundings. It is therefore advantageous to have roofing shingles or membranes that have high solar reflectivity in order to reduce the solar heat absorption. The surface reflectivity of an asphalt shingle or roofing membrane largely depends on the solar reflectance of the granules that are used to cover the bitumen.

In recent years, the state of California has implemented a building code requiring that all commercial roofing materials in low-slope applications need to exceed a minimum of 70% solar reflectance in order to qualify for their new energy budget code. To achieve such high level of solar reflectance, it has been proposed to coat the roof with a reflective coating over granulated roofing products, since the granules with current commercially available coloring technology are not capable of achieving such high levels of solar reflectance. Thus, white pigment containing latex coatings have been proposed and evaluated by various manufacturers. However, polymeric coatings applied have only a limited amount of service life and will require re-coat after certain years of service. Also, the cost of adding such a coating on roof coverings can be relatively high.

Also, commercially available white single ply roofing membranes from thermoplastic elastomers, PVC, or EPDM, etc., have been developed to achieve the required solar reflectance. Performance Roof Systems (Kansas City, Mo.) has also developed asphalt-based roofing membrane having a white acrylic pre-impregnated mat on the top surface. Further, U.S. Pat. No. 6,872,240 describes a heat reflective coated structural article for roofing application comprising a heat reflective component and a coated structural article which comprises a substrate having an ionic charge coated with a coating having essentially the same ionic charge such that the coating does not bleed through the substrate.

Further, in order to qualify as Energy Star® roofing material, a roofing membrane needs to exceed 65% solar reflectance. Typically, a white mineral-surfaced, asphalt-based roofing membrane has only 30-35% solar reflectance.

In order to reduce the solar heat absorption, one may use light colored roofing granules which are inherently more reflective towards the solar radiation. White pigment containing latex coatings have been proposed and evaluated by various manufacturers. However, consumers and homeowners often prefer darker or earth tone colors for their roof. In recent years, there have been commercially available roofing granules that feature a reflective base coat (i.e., a white coat) and a partially coated top color coat allowing the reflective base coat to be partially revealed to increase solar reflectance. Unfortunately, these granules have a "washed-out" color appearance due to the partially revealed white base coat.

Other manufactures have also proposed the use of exterior-grade coatings that were colored by infrared-reflective pigments for deep-tone colors and sprayed onto the roof in the field. U.S. Pat. No. 7,238,408 discloses an asphalt-based roofing material comprising mat saturated with an asphalt coating and a top coating having a top surface layer that has a solar reflectance of at least 70%. U.S. Patent Application Publication No. 2003/0152747 A1 discloses the use of granules with solar reflectance greater than 55% and hardness greater than 4 on the Moh's scale to enhance the solar reflectivity of asphalt based roofing products. However, there is no control of color blends and the novel granules are typically available only in white or buff colors. Furthermore, these novel granules tend to have high UV transmittance and hence are not suitable for roofing applications in bitumen based products. U.S. Pat. No. 7,455,899 discloses a non-white construction surface comprising a first reflective coating and a second reflective coating with total direct solar reflectance of at least 20%.

Also, there have been attempts in using special near-infrared reflective pigments in earth-tone colors to color roofing granules for increased solar reflectance. However, the addition of kaolin clays, which are used to make the metal-silicate binder durable through heat curing, inevitably reduce the color strength or the color intensity of the pigment.

Colored roofing granules can also be prepared using a metal silicate binder without adding clay and curing the binder at temperatures greater than glass sintering temperature, or through a "pickling" process by applying acid. However, these alternatives require either very high temperatures, or the use of corrosive chemicals, and in many cases could result in loss of color due to pigment degradation by the acid.

In the alternative, a non-silicate binder, such as a synthetic polymeric binder, can be used to coat the inert mineral materials in order to produce roofing granules with dark colors and high solar reflectance. However, the long-term durability and cost for polymeric coatings are not as advantageous as the silicate binders.

Another approach is provided by solar control films that contain either thin layer of metal/metal oxides or dielectric layers through vacuum deposition, and which have been commercially available for use in architectural glasses.

There is a continuing need for roofing materials, and especially asphalt shingles, that have improved resistance to thermal stresses while providing an attractive appearance.

SUMMARY OF THE INVENTION

The present invention provides asphalt-based roofing membranes with solar reflectance greater than 70 percent. The present invention also provides roofing granules having a solar heat reflectance of at least 70 percent. Roofing granules according to the present invention can be used in conventional roofing manufacturing processes to produce roofing membranes with solar heat reflectance of at least 70 percent.

Thus, in one aspect the present invention provides solar heat-reflective roofing granules comprising a base particle having a flake-like geometry, and an average particle size from #5 US mesh to #50 US mesh. The granules also include at least one uniform coating layer on the base particle, with the at least one coating layer having a thickness of at least one mil. The coating layer includes a coating binder and at least one solar heat-reflective pigment. The solar heat-reflective pigment provides a solar heat reflectance of greater than 70 percent to the granules. Preferably, the roofing granules have an average aspect ratio of at least 3, more preferably at least 5, and still more preferably, at least 7. In one aspect, it is preferred that the coating layer have a thickness of at least 2 mils. Preferably, the base particles have UV opacity greater than 70 percent, more preferably greater than 80 percent, and still more preferably greater than 90 percent. Preferably, the base particles are selected from the group consisting of crushed slate, slate granules, shale granules, mica granules, metal flakes, and flake-like synthetic particles. Preferably, the coating binder is selected from the group consisting of metal silicates, fluoropolymers, metal phosphates, silica coating binders, sol-gel coating binders, polysiloxanes, silicones, polyurethanes, and polyacrylates. Preferably, the at least one solar heat-reflective pigment is selected from the group consisting of titanium dioxide, calcium carbonate, zinc oxide, lithopone, zinc sulphide, white lead, glass microspheres, glass microbubbles, microvoid pigments, and synthetic polymeric opacifiers. In one presently preferred embodiment, the solar heat-reflective roofing granules are white in color, and preferably have $(a^{*2}+b^{*2})^{1/2}$ less than 6.

In another aspect, the present invention provides solar heat-reflective roofing products including roofing shingles and roofing membranes comprising a base sheet, and solar heat-reflective roofing granules on top of the base sheet. The granules include a base particle having a flake-like geometry, and an average particle size from #5 US mesh to #50 US mesh, as well as a uniform coating layer on the base particle. The coating layer preferably has a thickness of at least one mil. Preferably, the coating layer includes a coating binder and at least one solar heat-reflective pigment. The solar heat-reflective pigment provides a solar heat reflectance of greater than 70 percent to the granules. Preferably, the granules cover at least 85 percent, more preferably 90 percent, and still more preferably, at least 95 percent, of the surface area of the base sheet. Preferably, the roofing granules particles have an average aspect ratio of at least 3. More preferably, the roofing granules have an average aspect ratio of at least 5. Still more preferably, the roofing granules have an average aspect ratio of at least 7. In one aspect, it is preferred that the coating layer have a thickness of at least 2 mils. Preferably, the base particles are selected from the group consisting of crushed slate, slate granules, shale granules, mica granules, metal flakes, and flake-like synthetic particles. Preferably, the coating binder is selected from the group consisting of metal silicates, fluoropolymers, metal phosphates, silica coating binders, sol-gel coating binders, polysiloxanes, silicones, polyurethanes, and polyacrylates. Preferably, the at least one solar heat-reflective pigment is selected from the group consisting of titanium dioxide, calcium carbonate, zinc oxide, lithopone, zinc sulphide, white lead, glass microspheres, glass microbubbles, microvoid pigments, and synthetic polymeric opacifiers.

In another embodiment, the present invention provides solar heat-reflective roofing products such as roofing shingles and roofing membranes in which the solar heat-reflective roofing granules comprising primary roofing granules, and the roofing product also includes secondary roofing granules interspersed among the primary roofing granules. Preferably, the secondary roofing granules include at least one algaecide to provide algae resistance to the shingle or membrane.

In another aspect, the present invention provides a process for preparing solar heat reflective roofing granules. The process comprises providing base particles having a flake-like geometry, and an average particle size from #5 US mesh to #50 US mesh; providing a coating composition including a coating binder and at least one solar heat-reflective pigment; and coating the base particles with the coating composition to provide a uniform coating layer on the base particles, the solar heat-reflective pigment providing a solar heat reflectance of greater than 70 percent to the granules.

In yet another aspect, the present invention provides a process for preparing solar heat reflective roofing products such as roofing shingles and roofing membranes. The process comprises providing base particles having a flake-like geometry, and an average particle size from #5 US mesh to #50 US mesh, providing a coating composition including a coating binder and at least one solar heat-reflective pigment; coating the base particles with the coating composition to provide a uniform coating layer on the base particles, the solar heat-reflective pigment providing a solar heat reflectance of greater than 70 percent to the granules, thus providing solar heat-reflective roofing granules. The process further comprises providing a bituminous base sheet having an upper surface; and applying the solar heat-reflective roofing granules to the upper surface of the base sheet, the solar heat heat-reflective roofing granules being applied to at least 85 percent of the upper surface. Preferably, the solar heat-reflective roofing granules are applied to at least 90 percent of the upper surface. More preferably, the solar heat-reflective roofing granules are applied to at least 95 percent of the upper surface.

DETAILED DESCRIPTION

The present invention provides roofing granules with solar heat reflectance greater than 70 percent and high surface area coverage. The roofing granules are prepared by encapsulating base particles that have a preferred average particle shape and size for high coverage with a white, highly solar heat reflective coating suitable for roofing applications.

As used in the present specification and claims, the "aspect ratio" or "first aspect ratio" of a particle means the ratio of the longest dimension of the particle to the shortest dimension of the particle in a plane perpendicular to the longest dimension of the particle. As used in the present specification and claims, the "second aspect ratio" is to be determined in the plane of the longest dimension of the particle, and including the next longest dimension of the particle. In that plane, the second aspect ratio is the ratio of the longest dimension of the particle in that plane to the dimension of the particle in that plane and perpendicular to the longest dimension of the particle in that plane.

Figure 6:
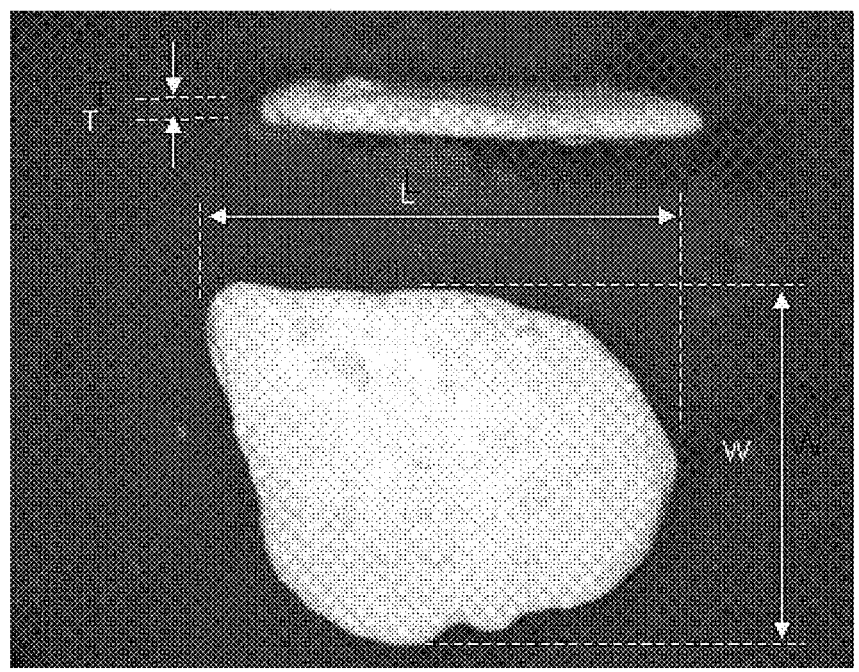
FIG. 6 is a composite photograph showing a roofing granule according to the present invention in a side view and in a plan view.

An example of the determination of aspect ratios for a particle can be shown by reference to the micrograph of FIG. 6, in which the length "L," the width "W," and the thickness "T," of a representative solar heat-reflective particles according to the present invention are labeled on the micrograph. The first aspect ratio for this particle is calculated as the ratio of the length "L" to the thickness "T," and the second aspect ratio is calculated as the ratio of the length "L" to the width "W."

As used in the present specification and claims, "solar reflective," and "solar heat-reflective" refer to reflectance in the total solar radiation spectrum of 300 to 2500 nm. "Near infrared reflective" or "near IR-reflective refers to reflectance in the near infrared range (700 to 2500 nm) of the electromagnetic spectrum, and "high solar reflectance" means having an average reflectance of at least about 70 percent over the near infrared range (700 to 2500 nm) of the electromagnetic spectrum.

As used in the present specification and claims, "solar heat reflective particle" means a particulate material having a solar reflectance of at least 60 percent, and preferably at least about 70 percent.

As used in the present specification and claims, "solar reflective functional pigment" denotes a pigment selected from the group consisting of light-interference platelet pigments including mica, light-interference platelet pigments including metal oxide, mirrorized silica pigments based upon metal-doped silica, metal flake pigments, metal oxide coated flake pigments, silica encapsulated metal flake pigments, titanium dioxide, zinc oxide, white pigments, and alumina. As used in the present specification and claims, "granule coloring pigment" denotes a conventional metal oxide-type pigment employed to color roofing granules.

As used in the present specification and claims, "granule coloring pigment" denotes a conventional metal oxide-type pigment employed to color roofing granules.

As used in the present specification and claims, the strength in color space E* is defined as $E^* = (L^{*2} + a^{*2} + b^{*2})^{1/2}$, where L*, a*, and b* are the color measurements for a given sample using the 1976 CIE L*a*b* color space. The total color difference ΔE* is defined as $\Delta E^* = (\Delta L^{*2} + \Delta a^{*2} +$ $b^{*2})^{1/2}$ where $\Delta L^*$, $\Delta a^*$, and $\Delta b^*$ are respectively the differences in $L^*$, $a^*$ and $b^*$ for two different color measurements.

As used in the present specification and claims, "white" means that $(a^{*2}+b^{*2})^{1/2}$ is less than 6 and $L^*>80$.

As used in the present specification and claims "mesh size" means ASTM U.S. Standard mesh size, unless otherwise indicated.

Preferably, the present invention provides highly reflective, solid, durable, and crush-resistant granules suitable for roofing applications with granule sizes ranging from about #5 to #50 U.S. mesh. Preferably, the solar reflective roofing granules according to the present invention have a solar reflectance of at least about 70 percent.

Roofing granules according to the present invention are preferably made according to the process of the present invention by applying a solar heat reflective coating material to base particles. The base particles used in the process of the present invention are preferably particles having a flat or plate-like geometry. Preferably, the base particles are chemically inert and are at least 90 percent UV opaque. The base particles themselves preferably have an average particle size of from about #8 mesh to #50 US mesh. Base particles having a size distribution according the so-called #11 grading or #22 grading can be used in preparing the roofing granules of the present invention. Preferably, the base particles employed in the process of the present invention are flat or flake-like mineral particles. Examples of the suitable base particles include crushed slate, slate granules, shale granules, granule chips, mica granules, metal flakes, and synthetic particles with a flake-like geometry. Alternatively, the base particles can be formed from a suitable material by an extrusion, casting or like process, to give base particle having the desired average size and aspect ratio. Examples of processes for providing base particles having a predetermined desired shape are given by U.S. Pat. No. 7,811,630 incorporated herein by reference.

The size and size distribution of the base particles are preferably selected to achieve high surface coverage when the roofing granules are applied to the surface to be protected, such as a bituminous base layer of a roofing shingle. The high solar heat reflectance of the roofing products of the present invention is achieved by the selection of base particles having a suitable geometry and particle size distribution, and by the application of a suitable solar heat reflective coating material to the base particles.

In order to achieve a higher level of surface coverage, mixtures of roofing granules having different average particle sizes and particle size distributions can be employed. For example, a mixture of first or primary roofing granules having a plate-like geometry and a first average particle size and particle size distribution and coated with a solar-heat reflective coating and second or auxiliary roofing granules having a second average particle size and particle size distribution. The second roofing granules can also be coated with a solar heat-reflective coating, a conventional roofing granule coating, or a coating adapted to provide other desirable characteristics to the roofing shingle, such as resistance to the growth of algae.

Stone dust can be employed as the source of the base particles used for such second roofing granules. Stone dust is a natural aggregate produced as a by-product of quarrying, stone crushing, machining operations, and similar operations. In particular, dust from talc, slag, limestone, granite, marble, syenite, diabase, greystone, quartz, slate, trap rock, basalt, greenstone, andesite, porphyry, rhyolite, greystone, and marine shells can be used, as well as manufactured or recycled manufactured materials such as ceramic grog, proppants, crushed bricks, concrete, porcelain, fire clay, and the like. Ceramic materials, such as silicon carbide and aluminum oxide of suitable dimensions can also be used. Preferably, the base particles are manufactured from crushing naturally occurring rocks with low free silica into suitable sizes for their UV opacity and protection to asphalt when the roofing granules according to the present invention are employed to protect bituminous roofing materials such as asphalt shingles. Such silica-deficient rocks are generally dark in color and have low solar reflectance in the range around 8 to 15 percent.

The base particles employed to prepare the primary roofing granules are preferably mineral particles suitable for roofing applications, in the sense of providing UV opacity, and which are also have a plate-like or flat geometry. This geometry is desirable because roofing granules made from such plate-like or flat base particles tend to provide good coverage of the asphaltic base layer to be protected, and because granules prepared from such plate-like or flat base particles will have a tendency to lay flat as they are being deposited onto the moving web of molten asphalt during roofing membrane manufacture. Preferably, the coating applied to the base particles does not significantly affect the geometry of the resulting roofing granules. Thus, the primary roofing granules of the present invention will have essentially the same geometry as the plate-like or flat base particles from which the primary roofing granules are formed. The plate-like or flat geometry of such primary roofing granules provides enhanced total surface reflectance of the roofing shingles of the present invention due to the increase in spectral reflectance contribution, as compared to conventional roofing granules. Conventional roofing granules tend to have irregular shapes, so that there can be a significant loss in solar heat reflectance due to surface roughness.

The base particles employed to prepare the primary roofing granules are preferably encapsulated with a highly solar heat reflective coating to render them highly solar heat reflective. In one presently preferred embodiment, the highly solar heat reflective coating is white in color. Preferably, the surface area of the base particles is at least 90 percent covered with the solar heat reflective coating, more preferably at least 95 percent covered with the solar heat reflective coating, and still more preferably the at least 98 percent covered with the solar heat reflective coating. Still more preferably, the base particles are encapsulated completely with the solar heat reflective coating; that is, the entire surface area of the base particles is covered with the solar heat reflective coating.

Preferably, the composition and the thickness of the solar heat reflective coating are selected to provide solar heat reflective roofing granules with a solar heat reflectance of greater than 70 percent.

Preferably, the average first aspect ratio of the roofing granules is at least 3, more preferably at least 5, and still more preferably at least 7. Preferably, the average second aspect ratio ranges from about 1 to 3. The average aspect ratios of the roofing granules, assuming a uniform coating, will be slightly less than the average aspect ratio of the base particles.

Preferably, the thickness of the solar heat-reflective coating is at least one mil (0.001 inch, $2.54\times10^{-5}$ m), more preferably at least 2 mils, and still more preferably at least 3 mils, in order to achieve a solar reflectance greater than 70 percent. The desired thickness of the solar-heat reflective coating will depend upon the concentration of solar heat-reflective pigment(s) in the coating and the nature of the solar heat-reflective pigment(s) in the coating. Preferably, the coating is uniform, such that the thickness of the coating does not vary by more than about 25 percent, more preferably by no more than about 10 percent, from the average coating thickness, at the 95 percent confidence interval.

Examples of clays that can be employed in the process of the present invention include kaolin, other aluminosilicate clays, Dover clay, bentonite clay, etc.

Suitable solar heat reflective particles include titanium dioxides such as rutile titanium dioxide and anatase titanium dioxide, metal pigments, titanates, and mirrorized silica pigments.

In order to achieve high solar heat-reflectance, in one presently preferred embodiment, the binder, pigment, and ratio of pigment to binder are preferably selected such that the solar heat-reflective granules are white in color, and preferably have $(a^{*2}+b^{*2})^{1/2}$ less than 10, more preferably less than 6, and still more preferably, less than 2.5. Further, preferably the solar heat-reflective granules have an L* of at least 75, more preferably at least 80, still more preferably at least 85, and even more preferably at least 90.

Examples of mirrorized silica pigments that can be employed in the process of the present invention include pigments such as Chrom Brite™ CB4500, available from Bead Brite, 400 Oser Ave, Suite 600, Hauppauge, N.Y. 11788.

An example of a rutile titanium dioxide that can be employed in the solar heat reflective roofing granules of the present invention includes R-101, available from Du Pont de Nemours, P.O. Box 8070, Wilmington, Del. 19880.

Examples of metal pigments that can be employed in the solar reflective roofing granule of the present invention include aluminum flake pigment, copper flake pigments, copper alloy flake pigments, and the like. Metal pigments are available, for example, from ECKART America Corporation, Painesville, Ohio 44077. Suitable aluminum flake pigments include water-dispersible lamellar aluminum powders such as Eckart RO-100, RO-200, RO-300, RO-400, RO-500 and RO-600, non-leafing silica coated aluminum flake powders such as Eckart STANDART PCR 212, PCR 214, PCR 501, PCR 801, and PCR 901, and STAN DART Resist 211, STAN DART Resist 212, STAN DART Resist 214, STAN DART Resist 501 and STAN DART Resist 80; silica-coated oxidation-resistant gold bronze pigments based on copper or copper-zinc alloys such as Eckart DOROLAN 08/0 Pale Gold, DOROLAN 08/0 Rich Gold and DOROLAN 10/0 Copper.

Examples of titanates that can be employed in the solar reflective roofing granules of the present invention include titanate pigments such as colored rutile, priderite, and pseudobrookite structured pigments, including titanate pigments comprising a solid solution of a dopant phase in a rutile lattice such as nickel titanium yellow, chromium titanium buff, and manganese titanium brown pigments, priderite pigments such as barium nickel titanium pigment; and pseudobrookite pigments such as iron titanium brown, and iron aluminum brown. The preparation and properties of titanate pigments are discussed in Hugh M. Smith, *High Performance Pigments*, Wiley-VCH, pp. 53-74 (2002).

Examples of near IR-reflective pigments available from the Shepherd Color Company, Cincinnati, Ohio, include Arctic Black 10C909 (chromium green-black), Black 411 (chromium iron oxide), Brown 12 (zinc iron chromite), Brown 8 (iron titanium brown spinel), and Yellow 193 (chrome antimony titanium).

Aluminum oxide, preferably in powdered form, can be used as solar-reflective additive in the color coating formulation to improve the solar reflectance of colored roofing granules without affecting the color. The aluminum oxide should have particle size less than #40 mesh (425 micrometers), preferably between 0.1 micrometers and 5 micrometers. More preferably, the particle size is between 0.3 micrometers and 2 micrometers. The alumina should have a percentage of aluminum oxide greater than 90 percent, more preferably greater than 95 percent. Preferably the alumina is incorporated into the granule so that it is concentrated near and/or at the outer surface of the granule.

In addition, granule coloring pigments such as iron oxide, white pigments such as lithopone, zinc sulfide, zinc oxide, and lead oxide, void pigments such as spherical styrene/acrylic beads (Ropaque® beads, Rohm and Haas Company), and/or hollow glass beads having pigmentary size for increased light scattering, can also be mixed with the solar reflective particles and mineral particles and binder to form the uncured granules, or with the solar reflective particles to be adhered to the exterior surface of the uncured granules. In the case where an organic polymeric void pigment is employed, a lower temperature cycle is desirable to avoid alteration of or damage to such pigment. In addition, functional fillers can be added to improve total solar reflectance. Examples of functional fillers include calcined clay, pigment spacer, pigment disperser, coating viscosity modifiers, and nano-particle additives for pigment exfoliation.

A colored, infrared-reflective pigment can also be employed in preparing the solar heat reflective roofing granules of the present invention. Preferably, the colored, infrared-reflective pigment comprises a solid solution including iron oxide, such as disclosed in U.S. Pat. No. 6,174,360, incorporated herein by reference. The colored infrared-reflective pigment can also comprise a near infrared-reflecting composite pigment such as disclosed in U.S. Pat. No. 6,521,038, incorporated herein by reference. Composite pigments are composed of a near-infrared non-absorbing colorant of a chromatic or black color and a white pigment coated with the near-infrared non-absorbing colorant. Near-infrared non-absorbing colorants that can be used in the present invention are organic pigments such as organic pigments including azo, anthraquinone, phthalocyanine, perinone/perylene, indigo/thioindigo, dioxazine, quinacridone, isoindolinone, isoindoline, diketopyrrolopyrrole, azomethine, and azomethine-azo functional groups. Preferred black organic pigments include organic pigments having azo, azomethine, and perylene functional groups. When organic colorants are employed, a low temperature cure process is preferred to avoid thermal degradation of the organic colorants.

The solar-reflective roofing granules of the present invention can include conventional coatings pigments. Examples of coatings pigments that can be used include those provided by the Color Division of Ferro Corporation, 4150 East 56th St., Cleveland, Ohio 44101, and produced using high temperature calcinations, including PC-9415 Yellow, PC-9416 Yellow, PC-9158 Autumn Gold, PC-9189 Bright Golden Yellow, V-9186 Iron-Free Chestnut Brown, V-780 Black, V0797 IR Black, V-9248 Blue, PC-9250 Bright Blue, PC-5686 Turquoise, V-13810 Red, V-12600 Camouflage Green, V12560 IR Green, V-778 IR Black, and V-799 Black.

The solar reflective roofing granules of the present invention can also include light-interference platelet pigments. Light-interference platelet pigments are known to give rise to various optical effects when incorporated in coatings, including opalescence or "pearlescence."

Examples of light-interference platelet pigments that can be employed in the process of the present invention include pigments available from Wenzhou Pearlescent Pigments Co., Ltd., No. 9 Small East District, Wenzhou Economical and Technical Development Zone, Peoples Republic of China, such as Taizhu TZ5013 (mica, rutile titanium dioxide and iron oxide, golden color), TZ5012 (mica, rutile titanium dioxide and iron oxide, golden color), TZ4013 (mica and iron oxide, wine red color), TZ4012 (mica and iron oxide, red brown color), TZ4011 (mica and iron oxide, bronze color), TZ2015 (mica and rutile titanium dioxide, interference green color), TZ2014 (mica and rutile titanium dioxide, interference blue color), TZ2013 (mica and rutile titanium dioxide, interference violet color), TZ2012 (mica and rutile titanium dioxide, interference red color), TZ2011 (mica and rutile titanium dioxide, interference golden color), TZ1222 (mica and rutile titanium dioxide, silver white color), TZ1004 (mica and anatase titanium dioxide, silver white color), TZ4001/600 (mica and iron oxide, bronze appearance), TZ5003/600 (mica, titanium oxide and iron oxide, gold appearance), TZ1001/80 (mica and titanium dioxide, off-white appearance), TZ2001/600 (mica, titanium dioxide, tin oxide, off-white/gold appearance), TZ2004/600 (mica, titanium dioxide, tin oxide, off-white/blue appearance), TZ2005/600 (mica, titanium dioxide, tin oxide, off-white/green appearance), and TZ4002/600 (mica and iron oxide, bronze appearance).

Examples of light-interference platelet pigments that can be employed in the process of the present invention also include pigments available from Merck KGaA, Darmstadt, Germany, such as Iriodin® pearlescent pigment based on mica covered with a thin layer of titanium dioxide and/or iron oxide; Xirallic™ high chroma crystal effect pigment based upon A1203 platelets coated with metal oxides, including Xirallic T 60-10 WNT crystal silver, Xirallic T 60-20 WNT sunbeam gold, and Xirallic F 60-50 WNT fireside copper; ColorStream™ multi color effect pigments based on $SiO_2$ platelets coated with metal oxides, including ColorStream F 20-00 WNT autumn mystery and ColorStream F 20-07 WNT viola fantasy; and ultra interference pigments based on titanium dioxide and mica.

The solar heat reflective coating can be applied to the base particles by any coating process known in the art. However, coating processes which provide a uniform coating on the base particles are preferred. Preferably, the coating weight per unit surface area varies by no more than ten percent, more preferably by no more than five percent, and still more preferably, by no more than two percent. Preferably, the coating completely covers the base particles. Further, it is preferred that there be no areas of the base particles which are covered with only a nominal thickness of coating or which are not coated at all.

Examples of coating process which can be employed in preparing the roofing granules of the present invention include fluidized bed coating, encapsulation by gelation, chelation, solvent evaporation, coacervation, vesicle formation, and spinning disk encapsulation. In one embodiment of the present invention, fluidized bed coating is presently preferred. Suitable coating methods are disclosed in commonly assigned U.S. Patent Publication 2006/0251807 A1, incorporated herein by reference.

This type of coating device is preferably employed to provide a precise and uniform coating on the surface of the particles of the present invention. Multiple coating layers can be applied in a single batch by applying a sequence of coating materials to the particles through a suitable spray nozzle.

Wurster-type fluidized bed spray devices are available from a number of vendors, including Glatt Air Techniques, Inc., Ramsey, N.J. 07446; Chungjin Tech. Co. Ltd., South Korea; Fluid Air Inc., Aurora, Ill. 60504, and Niro Inc., Columbia, Md. 21045.

The nature, extent, and thickness of the coating provided in a Wurster-type fluidized bed spray device depends upon a number of parameters including the residence time of the particles in the device, the particle shape, the particle size distribution, the temperature of the suspending airflow, the temperature of the fluidized bed of particles, the pressure of the suspending airflow, the pressure of the atomizing gas, the composition of the coating material, the size of the droplets of coating material, the size of the droplets of coating material relative to the size of the particles to be coated, the spreadability of the droplets of coating material on the surface of the particles to be coated, the loading of the device with the mineral particles or batch size, the viscosity of the coating material, the physical dimensions of the device, and the spray rate.

Modified Wurster-type devices and processes, such as, the Wurster-type coating device disclosed in U.S. Patent Publication 2005/0069707, incorporated herein by reference, for improving the coating of asymmetric particles, can also be employed. In addition, lining the interior surface of the coating device with abrasion-resistant materials can be employed to extend the service life of the coater.

Other types of batch process particle fluidized bed spray coating techniques and devices can be used. For example, the particles can be suspended in a fluidized bed, and the coating material can be applied tangentially to the flow of the fluidized bed, as by use of a rotary device to impart motion to the coating material droplets.

In the alternative, other types of particle fluidized bed spray coating can be employed. For example, the particles can be suspended as a fluidized bed, and coated by spray application of a coating material from above the fluidized bed. In another alternative, the particles can be suspended in a fluidized bed, and coated by spray application of a coating material from below the fluidized bed, such as is described in detail above. In either case, the coating material can be applied in either a batch process or a continuous process. In coating devices used in continuous processes, uncoated particles enter the fluidized bed and can travel through several zones, such as a preheating zone, a spray application zone, and a drying zone, before the coated particles exit the device. Further, the particles can travel through multiple zones in which different coating layers are applied as the particles travel through the corresponding coating zones.

In the spinning disc method the granules and droplets of the liquid coating material are simultaneously released from the edge of a spinning disk, such as disclosed, for example, in U.S. Pat. No. 4,675,140.

Other processes suitable for depositing uniform coating on the granules will become apparent to those who are skilled in the art.

For example, magnetically assisted impaction coating ("MAIC") available from Aveka Corp., Woodbury, Minn., can be used to coat granules with solid particles such as titanium dioxide. Other techniques for coating dry particles with dry materials can also be adapted for use in the present process, such as the use of a Mechanofusion device, available from Hosokawa Micron Corp., Osaka, JP; a Theta Composer device, available from Tokuj Corp., Hiratsuka, JP, and a Hybridizer device, available from Nara Machinery, Tokyo, JP.

Coating materials useful in the process of the present invention can include a coating binder and one or more pigments, functional fillers, as well as functional additives for improved processing, to improve dispersion of pigments, to space out pigments for optimal scattering, to enhance fire resistance, to provide algae resistance, etc.

Preferably, the coating material, including the coating binder, the pigments employed, and the additives, applied to the base particles is suitable for roofing applications. Coating materials which provide coatings with very good outdoor durability are preferred. It is also preferred that the coating material employed provide a coating with excellent fire resistance.

Examples of coating binders that can be employed to prepare the coat material used to coat the base particle for providing the solar heat reflective roofing granules of the present invention include metal silicates, fluoropolymers, metal phosphates, silica coatings, sol-gel coatings, polysiloxanes, silicone coating, polyurethane coating, polyacrylates, or their combinations.

Coating compositions employed by the present invention can include inorganic binders such as ceramic binders, and binders formed from silicates, silica, zirconates, titanates, phosphate compounds, et al. For example, the coating composition can include sodium silicate and kaolin clay.

Organic binders can also be employed in the process of the present invention. The use of suitable organic binders, when cured can also provide superior granule surface with enhanced granule adhesion to the asphalt substrate and with better staining resistance to asphaltic materials. Roofing granules including inorganic binders often require additional surface treatments to impart certain water repellency for granule adhesion and staining resistance. U.S. Pat. No. 5,240,760 discloses examples of polysiloxane-treated roofing granules that provide enhanced water repellency and staining resistance. With the organic binders, the additional surface treatments may be eliminated. Also, certain organic binders, particularly those water-based systems, can be cured by drying at much lower temperatures as compared to the inorganic binders such as metal-silicates, which often require curing at temperatures greater than about 500 degrees C. or by using a separate pickling process to render the coating durable. Examples of organic binders that can be employed in the process of the present invention include acrylic polymers, alkyds and polyesters, amino resins, melamine resins, epoxy resins, phenolics, polyamides, polyurethanes, silicone resins, vinyl resins, polyols, cycloaliphatic epoxides, polysulfides, phenoxy, fluoropolymer resins. Examples of uv-curable organic binders that can be employed in the process of the present invention include uv-curable acrylates, uv-curable polyurethanes, uv-curable cycloaliphatic epoxides, and blends of these polymers. In addition, electron beam-curable polyurethanes, acrylates and other polymers can also be used as binders. High solids, film-forming, synthetic polymer latex binders are useful in the practice of the present invention. Presently preferred polymeric materials useful as binders include uv-resistant polymeric materials, such as poly(meth)acrylate materials, including poly methyl methacrylate, copolymers of methyl methacrylate and alkyl acrylates such as ethyl acrylate and butyl acrylate, and copolymers of acrylate and methacrylate monomers with other monomers, such as styrene. Preferably, the monomer composition of the copolymer is selected to provide a hard, durable coating. If desired, the monomer mixture can include functional monomers to provide desirable properties, such as crosslinkability to the copolymers. The organic material can be dispersed or dissolved in a suitable solvent, such as coatings solvents well known in the coatings arts, and the resulting solution used to coat the granules. Alternatively, water-borne emulsified organic materials, such as acrylate emulsion polymers, can be employed to coat the granules, and the water subsequently removed to allow the emulsified organic materials of the coating composition to coalesce. When a fluidized bed coating device is used to coat the inorganic particles, the coating composition can be a 100 percent solids, hot-melt composition including a synthetic organic polymer that is heated to melt the composition before spray application.

Preferably, the coating material includes one or more solar heat reflective pigments. Examples of solar heat reflective pigments include titanium dioxide, calcium carbonate, zinc oxide, lithopone, zinc sulfide, white lead, and organic and inorganic opacifiers such as glass spheres.

The coating material can further include one or more functional additives. Examples of such functional additives include curing agents for the binder, pigment spacers, such as purified kaolin clays, and viscosity modifiers. The coating material can also contain biocides or algaecides for obtaining resistance to microbial discoloration.

Preferably, the coating material is formulated so that the final coating layer comprises from about 35 to 55 percent by weight pigment, more preferably, from about 45 to 50 percent by weight pigment.

Depending on the nature of the binder used to prepare the coating material, after application of the coating material to the base particles to form a coating layer, it may be necessary to cure the binder, as by application of heat, by application of ultraviolet radiation, or the like. If the binder is dispersed in a solvent such as water or an organic solvent, it may be necessary to drive off the solvent from the coating material after application of the coating material to the base particles to form a coating layer in order to encourage film formation, or otherwise "cure" the coating material. If the binder is a high solids material, cure may be effected by simply permitting the coated particles to cool after application of the coating material to the base particles to form a coating layer at an elevated temperature.

The solar heat reflective roofing granules of the present invention can used directly in conventional roofing membrane manufacturing by replacing the surfacing media without change in machinery. However, the processing conditions may need to be adjusted such that optimal granule embedment may be achieved to ensure the adhesion of the roofing granules to asphalt substrate.

Preferably, the roofing granules of the present invention are applied to the upper surface of a base sheet such that at least 85 percent of the upper surface of the base sheet is covered with the roofing granules. More preferably, at least 90 percent of the base sheet is covered with the roofing granules; and still more preferably, at least 95 percent of the base sheet is covered with the roofing granules.

The resultant roofing product can then be applied to a roof for effectively reflect solar heat such that the cool energy for indoor space may be reduced during hot summer times.

Figure 1:
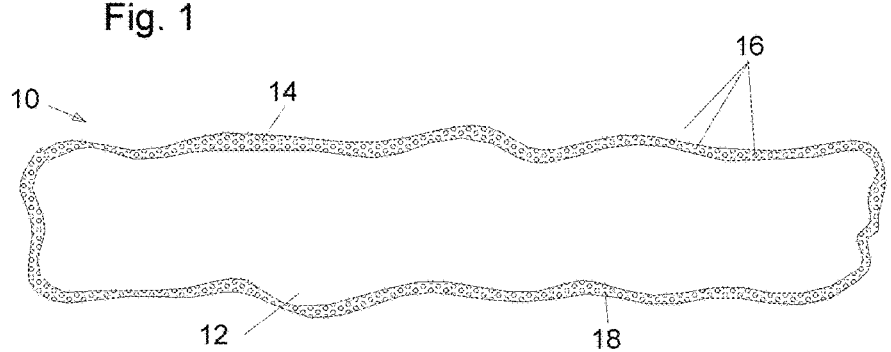
FIG. 1 is a schematic cross-sectional representation of a roofing granule according to the present invention.

Referring now to the figures, in which like reference numerals refer to like elements in each of the several views, there is shown schematically in FIG. 1 an example of solar heat reflective roofing granules according to the present invention.

FIG. 1 is a schematic cross-sectional representation of a first embodiment of solar reflective roofing granule 10 according to the present invention. The solar reflective roofing granule 10 comprises a plurality of inert mineral particles 12 having an aspect ratio greater than three and solar reflective particles 16 dispersed in a binder 14 to form a coating 18.

Figure 2:
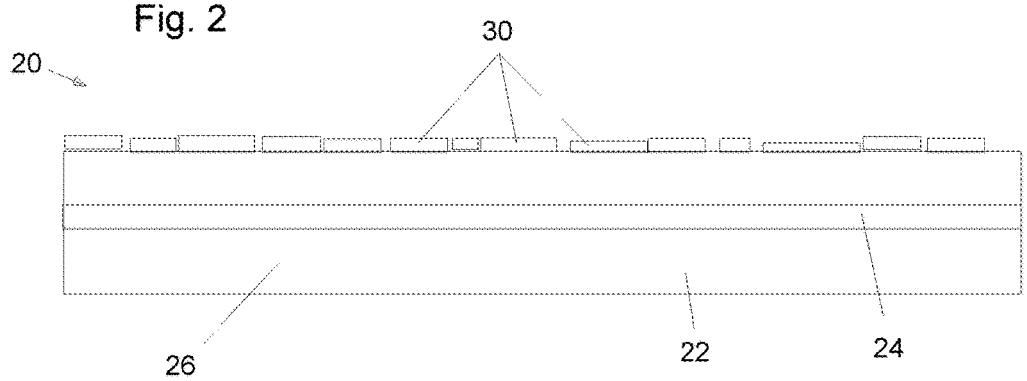
FIG. 2 is a schematic cross-sectional representation of a roofing product according to a first embodiment of the present invention.

FIG. 2 is a schematic cross-sectional representation of a first embodiment of a roofing product 20 according to the present invention. The roofing product 20 includes a base sheet 22 formed from a suitable reinforcing material such as a glass fiber web 24 embedded in a bituminous material 26. On the upper surface of the base sheet 22 are imbedded a plurality of generally plate-like roofing granules 30 formed from a suitable base particle, such as a slate particle, covered with a highly solar reflective coating. The roofing granules 30 cover the base sheet 22 in sufficient quantity and density to provide as solar heat reflectance of at least 70 percent.

Figure 3:
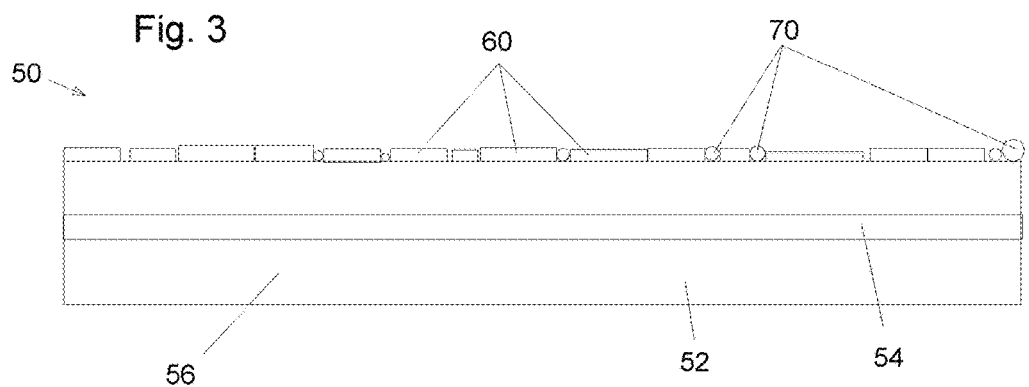
FIG. 3 is a schematic cross-sectional representation of a roofing product according to a second embodiment of the present invention.

FIG. 3 is a schematic cross-sectional representation of a second embodiment of a roofing product 50 according to the present invention. The roofing product 50 includes a base sheet 52 formed from a suitable reinforcing material such as a glass fiber web 54 embedded in a bituminous material 56. On the upper surface of the base sheet 52 are imbedded a plurality of generally a first class of plate-like roofing granules 60 formed from a suitable base particle, such as a slate particle, covered with a highly solar reflective coating. Interspersed among the first class of roofing granules 60 are roofing granules 70 of a second class, which may also be solar heat reflective granules, or provide another desired performance property, such as algae resistance. The second class of roofing granules 70 are significantly smaller in average dimension than the first class of roofing granules 60, and are generally spherical in shape, and are selected so that they will tend to lie in the interstices among the first group of roofing granules 60. The second class of roofing granules 70 are applied to the base sheet 52 after the first class of roofing granules 60 have been applied to the base sheet 52. The two classes of roofing granules 60, 70 cover the base sheet 52 in sufficient quantity and density to provide as solar heat reflectance of greater 70 percent, such as at least about 85 percent of the surface, at least about 90 percent of the surface, or even at least about 95% of the surface.

The solar reflective roofing granules of the present invention can be employed in the manufacture of roofing products, such as asphalt shingles and bituminous membranes, using conventional roofing production processes. Typically, bituminous roofing products are sheet goods that include a non-woven base or scrim formed of a fibrous material, such as a glass fiber scrim. The base is coated with one or more layers of a bituminous material such as asphalt to provide water and weather resistance to the roofing product. One side of the roofing product is typically coated with mineral granules to provide durability, reflect heat and solar radiation, and to protect the bituminous binder from environmental degradation. The solar reflective roofing granules of the present invention can be mixed with conventional roofing granules, and the granule mixture can be embedded in the surface of such bituminous roofing products using conventional methods. Alternatively, the solar reflective roofing granules of the present invention can be substituted for conventional roofing granules in manufacture of bituminous roofing products.

Bituminous roofing products are typically manufactured in continuous processes in which a continuous substrate sheet of a fibrous material such as a continuous felt sheet or glass fiber mat is immersed in a bath of hot, fluid bituminous coating material so that the bituminous material saturates the substrate sheet and coats at least one side of the substrate. The reverse side of the substrate sheet can be coated with an anti-stick material such as a suitable mineral powder or a fine sand. Roofing granules are then distributed over selected portions of the top of the sheet, and the bituminous material serves as an adhesive to bind the roofing granules to the sheet when the bituminous material has cooled. The sheet can then be cut into conventional shingle sizes and shapes (such as one foot by three feet rectangles), slots can be cut in the shingles to provide a plurality of "tabs" for ease of installation and aesthetic effect, additional bituminous adhesive can be applied in strategic locations and covered with release paper to provide for securing successive courses of shingles during roof installation, and the finished shingles can be packaged. More complex methods of shingle construction can also be employed, such as building up multiple layers of sheet in selected portions of the shingle to provide an enhanced visual appearance, or to simulate other types of roofing products. Alternatively, the sheet can be formed into membranes or roll goods for commercial or industrial roofing applications.

The bituminous material used in manufacturing roofing products according to the present invention is derived from a petroleum-processing by-product such as pitch, "straight-run" bitumen, or "blown" bitumen. The bituminous material can be modified with extender materials such as oils, petroleum extracts, and/or petroleum residues. The bituminous material can include various modifying ingredients such as polymeric materials, such as SBS (styrene-butadiene-styrene) block copolymers, resins, flame-retardant materials, oils, stabilizing materials, anti-static compounds, and the like. Preferably, the total amount by weight of such modifying ingredients is not more than about 15 percent of the total weight of the bituminous material. The bituminous material can also include amorphous polyolefins, up to about 25 percent by weight. Examples of suitable amorphous polyolefins include atactic polypropylene, ethylene-propylene rubber, etc. Preferably, the amorphous polyolefins employed have a softening point of from about 130 degrees C. to about 160 degrees C. The bituminous composition can also include a suitable filler, such as calcium carbonate, talc, carbon black, stone dust, or fly ash, preferably in an amount from about 10 percent to 70 percent by weight of the bituminous composite material.

The following examples are provided to better disclose and teach processes and compositions of the present invention. They are for illustrative purposes only, and it must be acknowledged that minor variations and changes can be made without materially affecting the spirit and scope of the invention as recited in the claims that follow.

EXAMPLE 1

Figure 5:
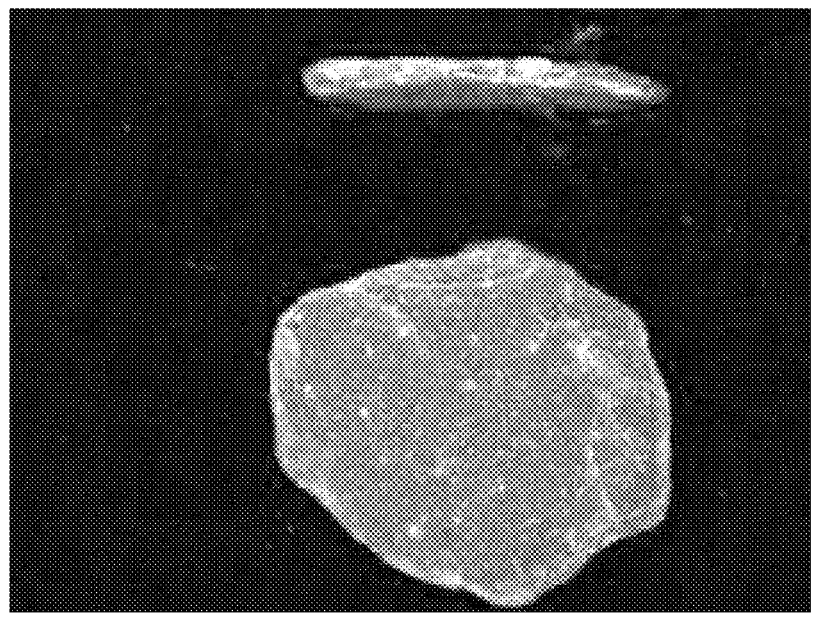
FIG. 5 is a composite photograph showing a slate base particle for use in making roofing granules according to the present invention in a side view and in a plan view.

140 Kg of slate granules (PN15 slate granules, available from ARTI—Groupe CARLAC Parc d'Entreprises l'Esplanade 7, rue Paul-Henri Spaak F-77462 Saint Thibault des Vignes, France,) were employed as base particles. A representative base particle is shown in the micrograph of FIG. 5. The base particles were encapsulated with a white coating material using a fluidized bed coater (Model 1800 with W18-3 plate and CPI-#2 tip spray nozzle, available from The Coating Place Inc., Verona, Wis.). A representative roofing granule is shown in the micrograph of FIG. 6. The highly reflective coating consisted of 35.7 Kg of sodium silicate (Grade 40 from OxiChem Corp, Dallas, Tex.), 59.4 Kg water, 30 Kg of titanium dioxide pigment (R101 from DuPont Corp., Wilmington, Del.), and 15 Kg of kaolin clay (AF grade Snobrite from Unimin Corp). The coating is prepared by blending the ingredients in a tank using an air-driven mechanical agitator with air pressure of 80 psi till reaching uniform dispersion. The particles are encapsulated by the coating in the fluidized bed coater with 0.9 scfm fluidizing air and inlet temperature of 210 degrees F. After proper fluidization, the coating is then sprayed at a spray rate of 280 g/min using atomizing air pressure of 80 psi and a Randolph 500 peristaltic pump.

The resultant granules have a very uniform white coating and complete encapsulation (FIG. 6). The color properties and solar reflectance were measured and are listed in Table 1. The resultant granules are then cured in a furnace at 700 degrees C. to insolubilize the silicate coating for long-term durability. The final granules have a very uniform white appearance and a solar reflectance of 73% (Table 1).

TABLE 1

| Description | CIE Color data | | | Solar Reflectance |
| --- | --- | --- | --- | --- |
| | L* | a* | b* | % |
| Slate granules encapsulated by white coating (before coating curing) | 91.48 | −0.04 | 2.18 | 70.6 |
| Slate granules encapsulated by white coating (after coating curing at 700 degree C.) | 90.70 | 0.11 | 5.65 | 73.3 |

EXAMPLE 2

The particle size distribution of a sample of the slate particles used to form coated roofing granules of Example 1 was determined using a CPA Haver videogranulometer (No. Serie 061). The measured particle size distribution is provided in Table 2 below.

TABLE 2

| Sieve size (mm) | Minimum percent remaining | Maximum percent remaining |
| --- | --- | --- |
| 3.150 | 0 | 2 |
| 2.500 | 1 | 6 |
| 2.000 | 6 | 14 |
| 1.600 | 12 | 20 |
| 1.000 | 12 | 19 |
| 0.800 | 10 | 17 |
| 0.630 | 7 | 15 |
| 0.500 | 3 | 6 |
| 0.315 | 2 | 6 |
| 0.250 | 0 | 2 |
| <0.250 | 0 | 1 |

EXAMPLE 3

The coated roofing granules of Example 1 were inspected and representative flakes were selected by eye. Particle shape was determined using an Olympus SZ-PT stereo microscope with 4× objective and 10× eyepiece, coupled with VIA-170 image system with pre-calibrated dimension measurement to measure the length (L), width (VV), and thickness (T). The results of the measurements are reported in Table 3 below.

TABLE 3

| Particle No. | width W, mm | length L, mm | thickness T, mm | aspect ratio L/W | aspect ratio L/T |
| --- | --- | --- | --- | --- | --- |
| 1 | 2.1386 | 3.3985 | 0.4642 | 1.589124 | 7.321198 |
| 2 | 2.354 | 2.6847 | 0.4901 | 1.140484 | 5.477862 |
| 3 | 2.2129 | 3.8102 | 0.6089 | 1.721813 | 6.257514 |
| 4 | 2.2277 | 3.1796 | 0.6219 | 1.427302 | 5.112719 |
| 5 | 2.7178 | 3.5693 | 0.245 | 1.313305 | 14.56857 |
| 6 | 1.8936 | 3.1796 | 0.3713 | 1.67913 | 8.563426 |
| 7 | 2.0792 | 3.2803 | 0.3639 | 1.577674 | 9.01429 |
| 8 | 2.302 | 3.1445 | 1.0619 | 1.365986 | 2.961202 |
| 9 | 1.8045 | 2.2467 | 0.245 | 1.245054 | 9.170204 |
| 10 | 1.396 | 4.8 | 0.4901 | 3.438395 | 9.79392 |
| 11 | 1.9604 | 2.6015 | 0.2822 | 1.327025 | 9.218639 |
| 12 | 1.5817 | 1.8394 | 0.3045 | 1.162926 | 6.040722 |
| 13 | 0.9579 | 1.8044 | 0.3416 | 1.883704 | 5.282201 |
| 14 | 0.6832 | 1.2788 | 0.245 | 1.87178 | 5.219592 |
| 15 | 2.0792 | 3.2453 | 0.2822 | 1.560841 | 11.5 |
| 16 | 1.3738 | 1.7912 | 0.2228 | 1.303829 | 8.039497 |
| 17 | 1.3144 | 2.0234 | 0.2896 | 1.53941 | 6.986878 |
| 18 | 1.6931 | 2.2029 | 0.2599 | 1.301104 | 8.475952 |
| 19 | 1.604 | 2.9956 | 0.3564 | 1.867581 | 8.405163 |
| 20 | 1.7905 | 3.0219 | 0.4381 | 1.687741 | 6.89774 |
| 21 | 2.1683 | 3.0745 | 0.7129 | 1.417931 | 4.312667 |
| 22 | 1.8416 | 2.6715 | 0.2846 | 1.450641 | 9.386859 |
| 23 | 1.9158 | 2.8905 | 0.5569 | 1.508769 | 5.190339 |
| 24 | 0.8911 | 1.4102 | 0.2376 | 1.582538 | 5.935185 |
| 25 | 1.7079 | 2.2861 | 0.5421 | 1.338544 | 4.217119 |
| 26 | 1.8193 | 4.1431 | 0.245 | 2.277304 | 16.91061 |
| 27 | 1.4035 | 2.7547 | 0.3861 | 1.962736 | 7.13468 |
| 28 | 1.8564 | 2.6672 | 0.2896 | 1.436759 | 9.209945 |
| 29 | 1.6782 | 2.2204 | 0.1856 | 1.323084 | 11.96336 |
| average | 1.7740 | 2.7661 | 0.3940 | 1.5966 | 7.8817 |
| S.D. | 0.4565 | 0.7991 | 0.1886 | 0.4397 | 3.0874 |
| 95% CI | 0.1662 | 0.2908 | 0.0686 | 0.1600 | 1.1237 |

The average width W was determined to be 1.774 mm±0.1662 (95% confidence). The average length L was determined to be 2.7661 mm±0.7668. The average thickness T was determined to be 0.3940 mm±0.0686 mm. Thus, the average aspect ratio L/W was determined to be 1.5966±0.1600, and the average aspect ratio L/T was determined to be 7.8817±1.1237. Since these measurements were done on particles selected by hand, there may be a bias towards larger particles. However, the averaged aspect ratio for L/V and L/T should be unbiased, since the particles will only repeat their geometry even with smaller particles

EXAMPLE 4

70 kg of the slate granules employed in Example 1 were encapsulated by fluidized bed coater (Model FL-M-60 18" Wurster accelerator, available from Vector Corp.) with a white coating comprising 22.5 kg sodium silicate binder (Grade 40 from OxiChem Corp., Dallas, Tex.), 27.5 kg water, 16 kg of titanium dioxide pigment (R101 from DuPont Corp., Wilmington, Del.), 6 kg of kaolin clay (AF grade Snobrite from Unimin Corp), and 5 kg of calcined kaolin spacer for titanium dioxide pigment (Ultrex 96 available from BASF Catalysts LLC, Iselin, N.J.). The particles were encapsulated with the process conditions of 2 bar spray air pressure, 2.7 bar accelerator pressure, 1500 cfm air, and an average 1075 g/min pump rate using a peristaltic pump and a 2.2 mm nozzle diameter spray gun. The total spray time was 65 minutes. The granules were then cured in a furnace at 700 degrees C. The resultant granules had a solar reflectance of 77% with CIE color reading of L*=92.78, a*=0.07, and b*=5.06.

EXAMPLE 5

Figure 4:
FIG. 4 is a photograph of a portion of the surface of a roofing product according to one embodiment of the present invention.

The solar heat-reflective roofing granules of Example 1 were applied to a moving bituminous base sheet at 130 feet/minute by feeding the granules at the feeder box of a typical roofing line. The granules were applied to the base sheet at sheet temperature of 335° F. followed by light press at 10~15 psi in order to provide a roofing product according to the present invention. FIG. 4 is a micrograph of the result roofing product.

Various modifications can be made in the details of the various embodiments of the processes, compositions and articles of the present invention, all within the scope and spirit of the invention and defined by the appended claims.

The invention claimed is:

1. Solar heat-reflective roofing granules comprising:
   a) a base particle having a flake-like geometry, an average particle size from #5 US mesh to #50 US mesh, and UV opacity greater than 70 percent
   b) a uniform coating layer on the base particle, the coating layer having a thickness of at least one mil, the coating layer comprising a coating binder and at least one solar heat reflective pigment;
   wherein the thickness of the coating layer does not vary by more than about 25 percent from the average coating thickness, at the 95 percent confidence interval,
   wherein the roofing granules have an aspect ratio of at least 5 and a solar heat reflectance of at least 70 percent.

2. Solar heat-reflective roofing granules according to claim 1, wherein the roofing granules have an aspect ratio of at least 7.

3. Solar heat-reflective granules according to claim 1, the base particles having UV opacity greater than 80 percent.

4. Solar heat-reflective granules according to claim 3, the base particles having UV opacity greater than 90 percent.

5. Solar heat-reflective roofing granules according to claim 1, wherein the coating layer has a thickness of at least 2 mils.

6. Solar heat-reflective roofing granules according to claim 1, wherein the base particles are selected from the group consisting of naturally occurring rocks with low solar reflectance in the range around 8 to 15 percent.

7. Solar heat-reflective roofing granules according to claim 1, wherein the coating binder is selected from the group consisting of metal silicates, fluoropolymers, metal phosphates, silica coating binders, and sol-gel coating binders, polysiloxanes, silicones, polyurethanes and polyacrylates.

8. Solar heat-reflective roofing granules according to claim 1, wherein the at least one solar heat-reflective pigment is selected from the group consisting of titanium dioxide, calcium carbonate, zinc oxide, lithopone, zinc sulphide, white lead, glass microspheres, glass microbubbles, microvoid pigments, and synthetic polymeric opacifiers.

9. Solar heat-reflective roofing granules according to claim 1, which have $(a^{*2}+b^{*2})^{1/2}$ less than 6.

10. Solar heat-reflective roofing granules according to claim 1, wherein the coating binder is selected from the group consisting of metal silicates, metal phosphates, silica coating binders, and sol-gel coating binders.

11. A solar heat-reflective roofing product according to claim 1, having a solar reflectance of greater than 70%.

12. A solar heat-reflective roofing product according to claim 1, further comprising a plurality of second granules disposed on the base sheet in interstices between the solar heat-reflective roofing granules.

13. A solar heat-reflective roofing product according to claim 1, wherein the coating binder is a metal silicate.

14. A solar heat-reflective roofing product comprising:
a) a base sheet, and
b) solar heat-reflective roofing granules laying flat on top of the base sheet, the granules comprising:
   1) a base particle having a flake-like geometry, an average particle size from #5 US mesh to #50 US mesh, and UV opacity greater than 70 percent,
   2) a uniform coating layer on the base particle, the coating layer having a thickness of at least one mil, the coating layer comprising a coating binder and at least one solar heat-reflective pigment;
wherein the granules have an aspect ratio of at least 5 and a solar reflectance of at least 70 percent, and
wherein the thickness of the coating layer does not vary by more than about 25 percent from the average coating thickness, at the 95 percent confidence interval.

15. A solar heat-reflective roofing product according to claim 14 wherein the granules cover at least 85 percent of the surface area of the base sheet.

16. A solar heat-reflective roofing product according to claim 15 wherein the granules cover at least 90 percent of the surface area of the base sheet.

17. A solar heat-reflective roofing product according to claim 16 wherein the granules cover at least 95 percent of the surface area of the base sheet.

18. A solar heat-reflective roofing product according to claim 14, wherein the roofing granules particles have an aspect ratio of at least 7.

19. A solar heat-reflective roofing product according to claim 15, the base particles having UV opacity greater than 80 percent.

20. A solar heat-reflective roofing product according to claim 19, the base particles having UV opacity greater than 90 percent.

21. A solar heat-reflective roofing product according to claim 14, wherein the coating layer has a thickness of at least 2 mils.

22. A solar heat-reflective roofing product according to claim 14, wherein the base particles are formed from a suitable material by an extrusion or casting process.

23. A solar heat-reflective roofing product according to claim 14, wherein the coating binder is selected from the group consisting of metal silicates, fluoropolymers, metal phosphates, silica coating binders, and sol-gel coating binders, polysiloxanes, silicones, polyurethanes and polyacrylates.

24. A solar heat-reflective roofing product according to claim 14, wherein the at least one solar heat-reflective pigment is selected from the group consisting of titanium dioxide, calcium carbonate, zinc oxide, lithopone, zinc sulphide, white lead, glass microspheres, glass microbubbles, microvoid pigments, and synthetic polymeric opacifiers.

25. Solar heat-reflective roofing granules according to claim 1, wherein the thickness of the coating layer does not vary by more than about 10 percent from the average coating thickness, at the 95 percent confidence interval.

26. A solar heat-reflective roofing product according to claim 14, wherein the thickness of the coating layer does not vary by more than about 10 percent from the average coating thickness, at the 95 percent confidence interval.

27. A solar heat-reflective roofing product according to claim 14, wherein the coating binder is selected from the group consisting of metal silicates, metal phosphates, silica coating binders, and sol-gel coating binders.

* * * * *